(12) United States Patent
Liang et al.

(10) Patent No.: US 7,862,766 B2
(45) Date of Patent: Jan. 4, 2011

(54) METHOD FOR FUNCTIONALIZATION OF NANOSCALE FIBER FILMS

(75) Inventors: Zhiyong Liang, Tallahassee, FL (US); Ben Wang, Tallahassee, FL (US); Chun Zhang, Tallahassee, FL (US); Shiren Wang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 902 days.

(21) Appl. No.: 11/749,302

(22) Filed: May 16, 2007

(65) Prior Publication Data

US 2010/0028639 A1 Feb. 4, 2010

Related U.S. Application Data

(60) Provisional application No. 60/747,343, filed on May 16, 2006.

(51) Int. Cl.
   *H01J 37/30* (2006.01)
   *H05B 6/00* (2006.01)
   *B29C 35/08* (2006.01)
   *B29C 35/10* (2006.01)
   *C01B 31/00* (2006.01)
   *B01J 19/08* (2006.01)

(52) U.S. Cl. .................. 264/485; 264/430; 264/494; 264/495; 204/157.47; 204/157.44; 977/742

(58) Field of Classification Search ............... None
   See application file for complete search history.

(56) References Cited

U.S. PATENT DOCUMENTS 6,036,857 A   3/2000   Chen et al.

| 2005/0046086 A1* | 3/2005 | Lee et al. ............. 264/444 |
| 2005/0239948 A1 | 10/2005 | Haik et al. |
| 2006/0017191 A1 | 1/2006 | Liang et al. |
| 2006/0207931 A1 | 9/2006 | Liang et al. |

OTHER PUBLICATIONS

Krasheninnikov et al., Formation of ion irradiation-induced atomic-scale defects on walls of carbon nanotubes, May 31, 2001, Physical Review B, vol. 63, Issue 24, p. 245405 (6), http://dx.doi.org/10.1103/PhysRevB.63.245405.*

Krasheninnikov et al., Ion-irradiation-induced welding of carbon nanotubes, Dec. 4, 2002, Physical Review B, vol. 66, Issue 24, p. 245403 (6), http://dx.doi.org/10.1103/PhysRevB.66.245403.*

(Continued)

*Primary Examiner*—Christina Johnson
*Assistant Examiner*—Benjamin Schiffman
(74) *Attorney, Agent, or Firm*—Sutherland Asbill & Brennan LLP

(57) ABSTRACT

Methods are provided for functionalizing a macroscopic film comprised of nanoscale fibers by controlled irradiation. The methods may include the steps of (a) providing a nanoscale fiber film material comprising a plurality of nanoscale fibers (which may include single wall nanotubes, multi-wall nanotubes, carbon nanofibers, or a combination thereof); and (b) irradiating the nanoscale fiber film material with a controlled amount of radiation in the open air or in a controlled atmosphere. The step of irradiating the nanoscale fiber film material is effective to functionalize the plurality of nanoscale fibers. Irradiated nanoscale fiber films are also provided having improved mechanical and electrical conducting properties.

11 Claims, 2 Drawing Sheets

OTHER PUBLICATIONS

Neupane et al., Proton irradiation effect on single-wall carbon nanotubes in a poly(3-octylthiophene) matrix, May 24, 2005, vol. 86, Issue 22, p. 221908 (3) http://dx.doi.org/10.1063/1.1940721.*

Hulman et al., Raman spectroscopy of single-wall carbon nanotubes and graphite irradiated by $_\gamma$ rays, Jul. 25, 2005, Journal of Applied Physics, vol. 98, Issue 2, p. 024311 (5), http://dx.doi.org/10.1063/1.1984080.*

Smith et al., Electron irradiation effects in single wall carbon nanotubes, Oct. 1, 2001, Journal of Applied Physics, vol. 90, Issue 7, pp. 3509-3515, http://dx.doi.org/10.1063/1.1383020.*

Nihira et al., Thermal Resistivity Changes in Electron Irradiated Pyrolytic Graphite, Aug. 1975, Japanese Journal of Applied Physics, vol. 14, No. 8, pp. 1099-1104, http://dx.doi.org/10.1143/JJAP.14.1099.*

Sammalkorpi et al., Irradiation-induced stiffening of carbon nanotube bundles, Nov. 21, 2004, Nuclear Instruments and Methods in Physics Research Section B: Beam Interactions with Materials and Atoms, vol. 228, Issues 1-4, pp. 142-145, http://dx.doi.org/10.1016/j.nimb.2004.10.036.*

Salvetat et al., Mechanical properties of carbon nanotubes, Jul. 29, 1999, Applied Physics A: Materials Science & Processing, vol. 69, No. 3, pp. 255-260, http://dx.doi.org/10.1007/s003399900114.*

Forro et al., Electronic and Mechanical Properties of Carbon Nanotubes, 2002, Fundemental Materials Research, Part III, pp. 297-320, http://dx.doi.org/10.1007/0-306-47098-5_22.*

Trasobares et al., Electron beam puncturing of carbon nanotube containers for release of stored N2 gas, The European Physical Journal B, vol. 22, No. 1, pp. 117-122, http://dx.doi.org/10.1007/BF01322353.*

Terrones et al., Coalescence of Single-Walled Carbon Nanotubes, May 19, 2000, Science, vol. 288, No. 5469, pp. 1226-1229, http://dx.doi.org/10.1126/science.288.5469.1226.*

Banhart, Irradiation effects in carbon nanostructures, Aug. 1999, Reports on Progress in Physics, vol. 62, No. 8 pp. 1181-1221, http://dx.doi.org/10.1088/0034-4885/62/8/201.*

Beuneu et al., Modification of multiwall carbon nanotubes by electron irradiation: An ESR study, Feb. 15, 1999, Physical Review B, vol. 59, Issue 8, pp. 5945-5949, http://dx.doi.org/10.1103/PhysRevB.59.5945.*

Suzuki et al., Low-Acceleration-Voltage Electron Irradiation Damage in Single-Walled Carbon Nanotubes, Japanese Journal of Applied Physics, vol. 43, No. 8B, pp. L 1118-L 1120, http://dx.doi.org/10.1143/JJAP.43.L1118.*

Kis et al., Reinforcement of single-walled carbon nanotube bundles by intertube bridging, Feb. 15, 2004, Nature Materials, vol. 3, pp. 153-157, http://dx.doi.org/10.1038/nmat1076.*

Aitkaliyeva, Irradiation Stability of Carbon Nanotubes, Aug. 2009, Texas A&M University Theses and Dissertations, http://hdl.handle.net/1969.1/ETD-TAMU-2009-08-3251.*

Wang, Functionalization of Carbon Nanotubes: Characterization, Modeling and Composite Applications, 2006, The Florida State University Theses and Dissertation, http://proquest.umi.com/pqdlink?did=1342723451&Fmt=7&clientId=19649&RQT=309&VName=PQD.*

Wikipedia, Title: "Carbon Nanotube," Date: Jan. 9, 2006, pp. 1-7.

Endo, et al., Title: "Buckypaper from Coaxial Nanotubes," Nature/vol.433/Feb. 3, 2005/www.nature.com/nature; pp. 476.

Dai, Title: "Carbon Nanotubes Opportunities and Challenges," Surface Science 500 (2002), pp. 218-241.

Gou, et al., Title: "Development of Nanotube Bucky Paper/Epoxy Nanocomposites," Proceedings of the TEXCOMP-6 International Symposium on Textile Composites, Sep. 11-13, 2002, pp. 1-5.

Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA , Jul. 14-18, 2003) pp. 1-7.

Gou, et al., Title: "Process Analysis and optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Ajayan, et al., "Aligned Carbon Nanotube Arrays Formed by Cutting a Polymer Resin-Nanotube Composite", Science, vol. 265, pp. 1212-1214 (1994).

Ajayan, et al., "Single-Walled Carbon Nanotube-Polymer Composites: Strength and Weakness," Advanced Materials 12:750-753 (2000).

Andrews, et al., "Nanotube composite carbon fibers", Applied Physics Letters, 75(9): pp. 1329-1331 (1999).

Chauvet, et al., "Magnetic anisotropies of aligned carbon nanotubes", The American Physical Society, 52(10): pp. 6963-6966 (1995).

Chen, et al., "Electrochemical synthesis of polypyrrole/carbon nanotube nanoscale composites using well-aligned carbon nanotube arrays", Applied Physics A, vol. 73, pp. 129-131 (2001).

Cooper, et al., "Distribution and Alignment of Carbon Nanotubes and Nanofibrils in a Polymer Matrix," Composites Science and Technology 62:1105-1112 (2002).

de Heer, et al., "Aligned Carbon Nanotube Films: Production and Optical and Electronic Properties," Science 268:845-847 (1995).

Dresselhaus, et al., "Graphite Fiber and Filament," M. Cardon, Ed., pp. 12-34 (1988).

Fan, et al., "Self-Oriented Regular Arrays of Carbon Nanotubes and Their Field Emission Properties," Science 283:512-514 (1999).

Fujiwara, et al., "Magnetic Orientation and Magnetic Properties of a Single Carbon Nanotube", The Journal of Physical Chemistry, 105(18): pp. 4383-4386 (2001).

Garg, et al., "Effect of chemical functionalization on the mechanical properties of carbon nanotubes", Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanosciencel, 3(3), 293-307, (2004).

Hertel, et al., "Deformation of Carbon Nanotubes by Surface van der Waals Forces," Physical Review B. 58:13870-13873 (1998).

Holloway, et al., "Texture Development Due to Preferential Grain Growth of Ho-Ba-Cu-O in 1.6-T Magnetic Field," J. Mat. Res. 8:727-733 (1993).

Knez, et al., "Electrochemical modification of individual nano-objects", Journal of Electroanalytical Chemistry, vol. 522: pp. 70-74 (2002).

Kumar, et al., "Fibers from Polypropylene/Nano Carbon Fiber Composites," Polymer 43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science 274:1701-1703 (1996).

Lourie, et al., "Evaluation of Young's modulus of carbon nanotubes by micro-Raman spectroscopy", Journal of Materials Research, 13(9): pp. 2418-2422 (1998).

Ni, et al., "Chemical Functionalization of Carbon Nanotubes through Energetic Radical Collisions," Physical Review B. 61:R16343-R16346(2000).

Qian, et al., "Load transfer and deformation mechanisms in carbon nanotube-polystyrene composites", Applied Physics Letters, 76(20): pp. 2868-2870 (2000).

Smith, et al., "Structural anisotropy of magnetically aligned single wall carbon nanotube films", Applied Physics Letters, 77(5): pp. 663-665 (2000).

Stéphan, et al., "Characterization of singlewalled carbon nanotubes-PMMA composites", Synthetic Metals, 108(2): pp. 139-149 (2000). Abstract.

Thostenson, et al., "Nanocomposites in context," Composites Science and Technology 65: 491-516 (2005).

Treacy, et al., "Exceptionally High Young's Modulus Observed for Individual Carbon Nanotubes," Nature 381:678-680 (1996).

Velasco-Santos, et al., "Chemical Functionalization of Carbon Nanotubes through an Organosilane," Nanotechnology 13:495-498 (2000).

Wang, et al., "Growth and characterization of buckybundles," Applied Physics Letters, 62(16): pp. 1881-1883 (1993).

Wood, et al., "Orientation of Carbon Nanotubes in Polymers and its Detection by Raman Spectroscopy," Composites: Part A 32:391-399 (2001).

Velasco-Santos, et al., "Chemical functionalization of carbon nanotubes through an organosilane", Nanotechnology, vol. 13, pp. 495-498 (2002). Abstract.

Liang, et al., "Molecular Dynamic Simulation and Experimental Investigation of Filling Chopped SWNTS with Resin Matrix Molecules to Enhance Interfacial Bonding and Loading Transfer in Nanocomposites," SAMPE 2004, Long Beach, CA, May 16-24, 2004, pp. 1-8.

U.S. Appl. No. 11/459,171, filed Jul. 21, 2006, Wang, et al.

U.S. Appl. No. 11/670,687, filed Feb. 2, 2007, Liang, et al.

U.S. Appl. No. 11/751,655, filed May 22, 2007, Liang, et al.

* cited by examiner

METHOD FOR FUNCTIONALIZATION OF NANOSCALE FIBER FILMS

CROSS-REFERENCE TO RELATED APPLICATIONS

This application claims benefit of U.S. Provisional Application No. 60/747,343, filed May 16, 2006. This application is incorporated herein by reference.

STATEMENT REGARDING FEDERALLY SPONSORED RESEARCH OR DEVELOPMENT

This invention was made with U.S. government support under Award No. FA9550-05-1-0271 awarded by the Air Force Office of Scientific Research. The U.S. government has certain rights in the invention.

BACKGROUND OF THE INVENTION

This invention is generally in the field of nanoscale fiber film materials, and more particularly in the field of materials comprising functionalized nanotubes, other functionalized nanoscale fibers, and the like.

Nanoscale fiber film materials are used in various applications such as high performance filtration membranes, battery and fuel cell electrodes, electromagnetic interference (EMI) shielding, and composite materials of construction. Unfortunately, the use of nano scale fiber film materials may be limited in some instances by their mechanical properties, which may include a low tensile modulus and a low tensile strength. It would therefore be useful to provide a method for substantially increasing the strength of nanoscale fiber films.

Conventional methods of treating fiber films, such as oxidation and fluorination processes, typically may involve multiple, time-consuming steps, which unfortunately may result in a low product yield, due to the size and chemical nature of nanoscale fibers. Furthermore, these conventional methods may include intense chemical reactions, long stirring times, multiple washings, and/or other steps that can shorten, dissolve, or even destroy the nanotube or nanofibers of the nanoscale fiber material, as well as damage the integrity of the nanoscale fiber film. Accordingly, the mass production of nanoscale fiber films treated with conventional methods is difficult at best. It would therefore be useful to provide new and improved methods for treating nanoscale fiber films that may be carried out rapidly and effectively, while maintaining the integrity of the nanoscale fiber film.

SUMMARY OF THE INVENTION

In one aspect, methods are provided for functionalizing nanoscale fiber films. In one embodiment, the method may include the steps of: (a) providing a nanoscale fiber film material which comprises a plurality of nanoscale fibers; and (b) irradiating the nanoscale fiber film material with a controlled amount of radiation. The step of irradiating the nanoscale fiber film material may increase the tensile strength and modulus of the nanoscale fiber film material, increase the toughness of the nanoscale fiber film material, increase the electrical and thermal conductivity of the nanoscale fiber film material, or may increase a combination of these properties.

In a preferred embodiment, the step of irradiating the nanoscale fiber film material is effective to functionalize the plurality of nanoscale fibers. The step of irradiating the nanoscale fiber film material may create cross-links, interconnections, junctions, or a combination thereof, in the plurality of nanoscale fibers. The irradiation step also may increase interfacial bonding in the plurality of nanoscale fibers.

In one embodiment, the step of irradiating the nanoscale fiber film material may utilize an electron bean The electron bean may irradiate the nanoscale fiber film material at about 2 MeV, and may apply a dose of electrons in the range from about $10 \times 10^{15}$ to about $300 \times 10^{15}$ e/cm$^2$. In another embodiment, the step of irradiating the nanoscale fiber film material may include applying an ion particle beam to the nanoscale fiber film material. In yet another embodiment, the step of irradiating the nanoscale fiber film material may include applying an ultra-violet beam to the nanoscale fiber film material.

In one embodiment, the step of providing the nanoscale fiber film material includes the steps of: (a) suspending the plurality of nanoscale fibers in a liquid medium; and (b) removing the liquid medium by at least one of filtration or vaporization to form the nanoscale fiber film material. The nanoscale fiber film material preferably may have a thickness in the range from about 5 to about 50 microns. The plurality of nanoscale fibers preferably includes a plurality of carbon nanotubes.

In another aspect a functionalized nanoscale fiber film material is provided. Preferably, the functionalized nanoscale fiber film material include a plurality of nanoscale fibers functionalized by a controlled irradiation process. The functionalized nanoscale fiber film material may have, relative to a non-irradiated nanoscale fiber film material of the same construction, increased tensile strength, increased toughness, increased electrical and thermal conductivity, or a combination thereof.

The nanoscale fiber film material may have a plurality of cross-links, interconnections, junctions, or a combination thereof, between or among the plurality of nanoscale fibers. In one embodiment, the nanoscale fiber film material may have a thickness in the range from about 5 to about 50 microns and the plurality of nanoscale fibers may include a plurality of carbon nanotubes.

DETAILED DESCRIPTION OF THE INVENTION

Figure 1:
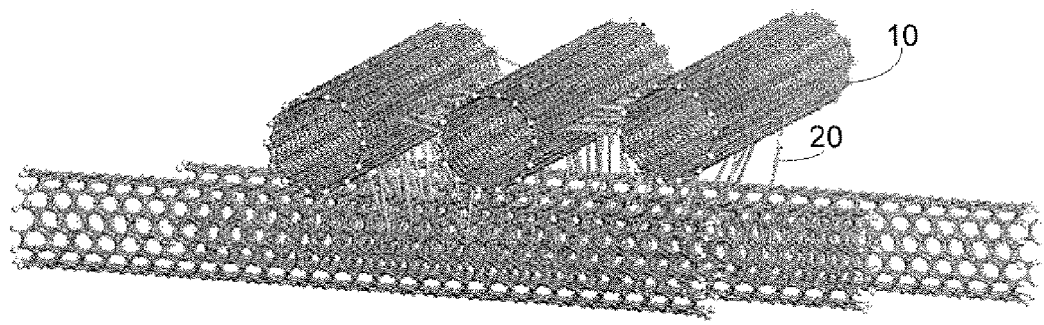
FIG. 1 is a cross-sectional, perspective view illustrating a certain embodiment of a nanoscale fiber film material in which nanotubes are cross-linked with cross-links formed by an irradiation process.

Methods have been developed for functionalizing nanoscale fiber film materials by treating a nanoscale fiber film with an irradiation process to effectively and quickly functionalize the film. Unlike conventional chemical methods of functionalizing nanoscale fiber films, which may be time consuming, damaging, and inefficient, the instant methods utilize high penetration and efficiency of energetic beam irradiation and advantageously may avoid or minimizes the problems associated with conventional chemical treatment techniques. For instance, the irradiation process may eliminate the need to use any chemical or washing processes, and may require only a short processing time. Furthermore, because the yield rate this method is almost 100%, the process has excellent potential for low cost mass production, The present methods may be rapidly performed, provide effective functionalization, and maintain film integrity.

As used herein, the terms "comprise," "comprising," "include," and "including" are intended to be open, non-limiting terms, unless the contrary is expressly indicated.

The Nanoscale Fiber Film

The process can be used on essentially any nanoscale fiber film. As used herein, the term "nanoscale fiber film" refers to a thin, macroscopic sheet composed of many nanoscale fibers dispersed in a network, and the term "nanoscale fibers" refers to a thin, greatly elongated solid material, typically having a cross-section or diameter of less than 500 nm. The nanoscale fibers may comprise carbon nanoscale fibers or, potentially, other inorganic nanoscale fibers.

In a particular embodiment, the nanoscale fibers comprise carbon nanoscale fibers such as single walled carbon nanotubes (SWNTs), multiple-walled carbon nanotubes (MWNTs), carbon nanofibers (CNFs), or mixtures thereof. SWNTs typically have small diameters (~1-5 nm) and large aspect ratios, while MWNTs typically have large diameters (~5-200 nm) and small aspect ratios. CNFs are filamentous fibers resembling whiskers of multiple graphite sheets. As used herein, the term "carbon nanotube" refers to carbon fullerene, a synthetic graphite, which typically has a molecular weight of between about 840 and about 10 million or more. Carbon nanotubes are commercially available, for example, from Carbon Nanotechnologies, Inc. (Houston, Tex.), or can be made using techniques known in the art. In a preferred embodiment, the nanoscale fibers comprise or consist of carbon nanotubes, including both SWNTs and MWNTs (multiple-walled carbon nanotubes).

The nanoscale fibers optionally may be chemical modified or coated with other materials such as metals. The nanotubes optionally may be opened or chopped, for example, as described in U.S. Patent Application Publication No. 2006/0017191 A1, which is incorporated herein by reference.

The nanoscale fiber film may be fabricated by suspending nanoscale fibers in a liquid, and then removing the liquid to form a film. For example, the films can be formed by dispersing nanotubes in water to form suspensions, and then filtering or vaporizing the suspensions to form the film.

The nanoscale fibers in the film can be randomly dispersed or aligned. An aligned nanoscale fiber film may be prepared, for example, using in situ filtration of a suspension in a high strength magnetic field, as described in U.S. Patent Application Publication No. 2005/0239948 to Haik et al., which is incorporated herein by reference.

In one embodiment, the nanoscale film is from 5 to 50 microns thick with a typical area density of 0.0705 oz ft$^2$ (or 21.5 g/m$^2$) or greater.

The Methods

The methods of nanoscale fiber film functionalization include an irradiation step. In a preferred embodiment, the method includes (a) providing a nanoscale fiber film material comprising a plurality of nanoscale fibers; and (b) irradiating the nanoscale fiber film material in open air or in a controlled environment, such as an Argon gas atmosphere, with an amount of radiation effective to functionalize the plurality of nanoscale fibers.

The nanoscale film is irradiated with an amount of radiation effective to functionalize the nanoscale film. The terms "functionalization" and "functionalize" refer to the creation of cross-links, vacancies, knock-on carbon atoms, or pentagon/heptagon Stone-Wales defects, as well as various interconnections or junctions, in and/or among the nanoscale fibers, or to another alteration that changes one or more mechanical and other physical and/or chemical properties of the nanoscale fiber film relative to that of a non-irradiated nanoscale fiber film. Non-limiting examples of these mechanical properties include strength, tensile strength, toughness, and strain resistance. The irradiation process may increase interfacial bonding in the film. FIG. 1 shows one example of how a plurality of nanotubes 10 may be joined together by cross-links 20 formed between the nanotubes 10 by irradiating a nanoscale fiber film material.

The irradiation process is controlled. That is, the step of irradiating the nanoscale fiber film material is performed in a controlled (i.e., selective and measured) manner so that a controlled amount of radiation is applied to the nanoscale fiber film. This is not the uncontrolled irradiation that may occur from the random exposure to environmental radiation from natural sources (e.g., sunlight) and man-made sources (e.g., lighting, communication, and other devices). The irradiation process may be conducted with a controlled application of an energetic beam, such as an electron beam, an ion particle beam, or an ultraviolet (UV) light beam, using techniques and equipment known in the art. For example, an irradiation dose of electron beam treatment can be in a large range and as high as $2 \times 10^{22}$ e/cm$^2$. For ion particle beam irradiation, incident energies of light ions as low as 50 eV can lead to nanotube crosslink. Significant improvement of electrical conductivity and Young modulus of SWNTs also have been reported. Using no more than routine experimentation, one skilled in the art readily can determine the relationship between the irradiation intensity, the degree of functionalization, and the mechanical properties of the film. Based on such results, an appropriate dose or duration of irradiation can be determined. In a particular embodiment, the irradiation is conducted with an electron beam, and the electron beam irradiates that nanoscale fiber film with a dose of electrons in the range from about $10 \times 10^{15}$ to about $300 \times 10^{15}$ e/cm$^2$.

The degree of functionalization can be tailored by adjusting the irradiation intensity. The irradiation intensity can be adjusted by selecting the acceleration voltage, current, and exposure time. In a particular embodiment, the irradiation is carried out at about 2 MeV. The irradiation may take place while the nanoscale fiber film material is on a cooled plate. In addition, using a commercialized irradiation facility, such as the 5 MeV electron beam facility at Kent State University/Mercury Plastics Inc. (Cleveland, Ohio), the functionalization process may be continuous and scaled up for mass production.

The functionalized nanoscale fiber films may be used in a wide variety of applications. In particular, films with improved mechanical properties are highly desirable in filtration membranes, battery electrodes, fuel cell electrodes, EMI shielding, and composite material applications. In addition, the functionalized nanoscale films may be used in applications requiring highly pure materials, or in applications needing porous nanoscale films. The flexibility and strength of the functionalized nanoscale film facilitates easy handling, and may allow for the incorporation of the nanoscale materials into a variety of composite materials of construction. These composite materials of construction may be used in high strength, lightweight structural members (e.g., for automotive body parts, athletic equipment, aircraft, and spacecraft), nanoelectronics, fuel cells, optical equipment, and video displays (e.g., field emission displays). Nanotube-metal matrix materials also can be used to make extremely strong structural materials for aircraft, spacecraft, power-transmission lines, and suspension bridges.

The Functionalized Film

The nanoscale fiber film material comprises a plurality of nanoscale fibers. In a particular embodiment, the plurality of nanoscale fibers are functionalized with an irradiation process. As a result of the irradiation process, the nanoscale fiber film material may have at least one improved mechanical property. For example, the nanoscale fiber film may have increased tensile modulus, increased tensile strength, increased toughness, or increased strain resistance. In a preferred embodiment, the nanoscale fiber film material has a thickness in the range from about 5 to about 50 microns.

The plurality of nanoscale fibers may comprise carbon nanoscale fibers, inorganic nanoscale fibers, or both. In a particular embodiment, the nanoscale fibers comprise carbon nanoscale fibers such as single walled carbon nanotubes (SWNTs), multiple-walled carbon nanotubes (MWNTs), carbon nanofibers (CNFs), or mixtures thereof, The plurality of nanoscale fibers may have at least one feature such as cross-links, vacancies, knock-on carbon atoms, or Stone-Wales defects, as well as interconnections or junctions, created with the irradiation process.

The functionalized nanoscale fiber film may be included as part of a multi-component structure. In one case, the functionalized nanoscale fiber film is part of a laminate. For example, one or more layers of the functionalized nanoscale film may be layered with one or more layers of a second material. The second material may be a polymer, a ceramic, a metal, a glass, or a semi-conductor. The second material may be monolithic or fibrous. An adhesive material optionally may be included in the laminate, for example to secure the various layers together. In another case, the functionalized nanoscale fiber film is part of a unitary composite. For example, the unitary composite may include a functionalized nanoscale fiber film dispersed in a matrix material. For example, the matrix material may be a polymer, a metal, or a glass. The matrix material may be a thermoplastic material that is combined in its liquid state with a nanoscale fiber film and then solidified. The nanoscale fiber film may be functionalized before or after combination with other components of the multi-component structure, depending for example on the other materials construction, location, and/or thickness.

The methods and materials described above will be further understood with reference to the following non-limiting examples.

EXAMPLE 1

Electron Beam Irradiation of SWNT Film

SWNTs were obtained from Carbon Nanotechnologies Inc. (Houston, Tex.), The nanotubes were P-Grade purified SWNTs with an average diameter of about 1 to about 1.2 nm and an average length of about 200 to about 500 nm.

Nanotube films were prepared from the SWNTs as follows: The SWNTs were dispersed with sonification into distilled water containing Triton X-100 surfactant in order to form a stable suspension. The SWNT concentration in the suspension was 40 mg/L. Next, about 12 to 15 liters of suspension was filtered using a custom-made filter with a 0.45 µm nylon filter membrane from Millipore, Inc. (Billerica, Mass.). The filtration process yielded a SWNT film (i.e., a sheet or membrane). The film was then washed using isopropanol. The length and width dimensions of the SWNT film were about 9 inches by 9 inches.

The film was cut into 2 inch by 3 inch pieces for the irradiation. E-beam irradiation of the SWNT films was conducted using an electron accelerator at Kent State University/Mercury Plastics, Inc. (Middlefield, Ohio). During the irradiation, the SWNT films were placed directly on basement plates, which were cooled with circulated water. Samples were irradiated at 2 MeV for various times in open air in order to achieve the desired E-beam doses. The doses were $9\times10^{15}$, $93\times10^{15}$, $139\times10^{15}$, $186\times10^{15}$, and $281\times10^{15}$ e/cm².

Figure 2:
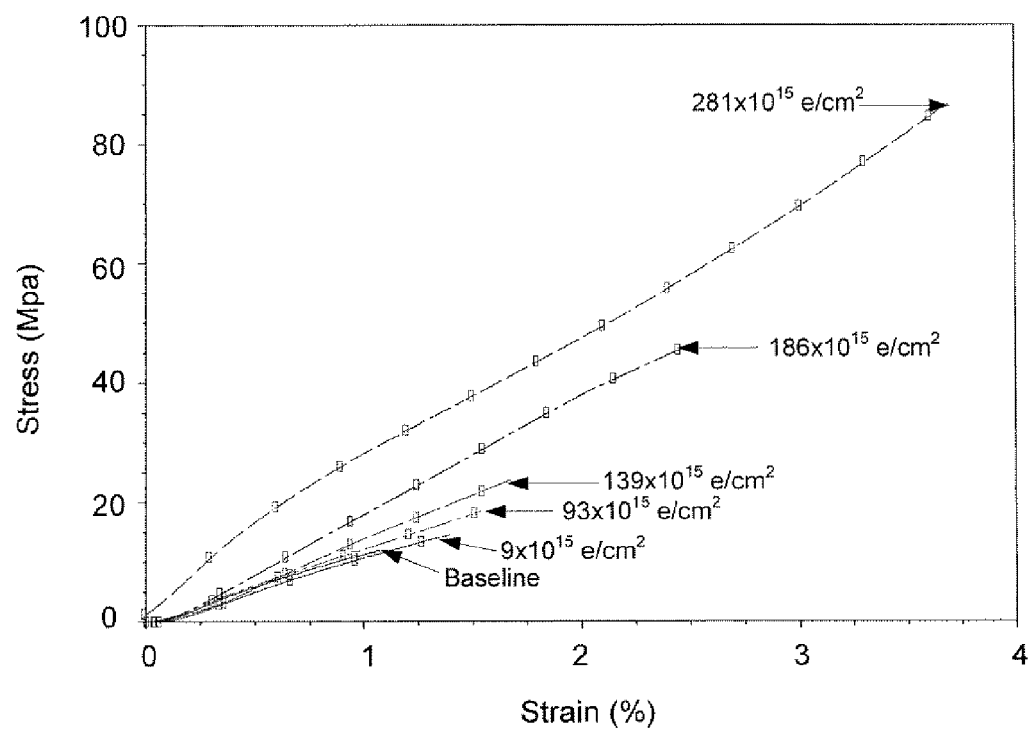
FIG. 2 is a graph which shows a stress-strain curve of a nanoscale fiber film material after receiving various doses of irradiation.
Figure 3:
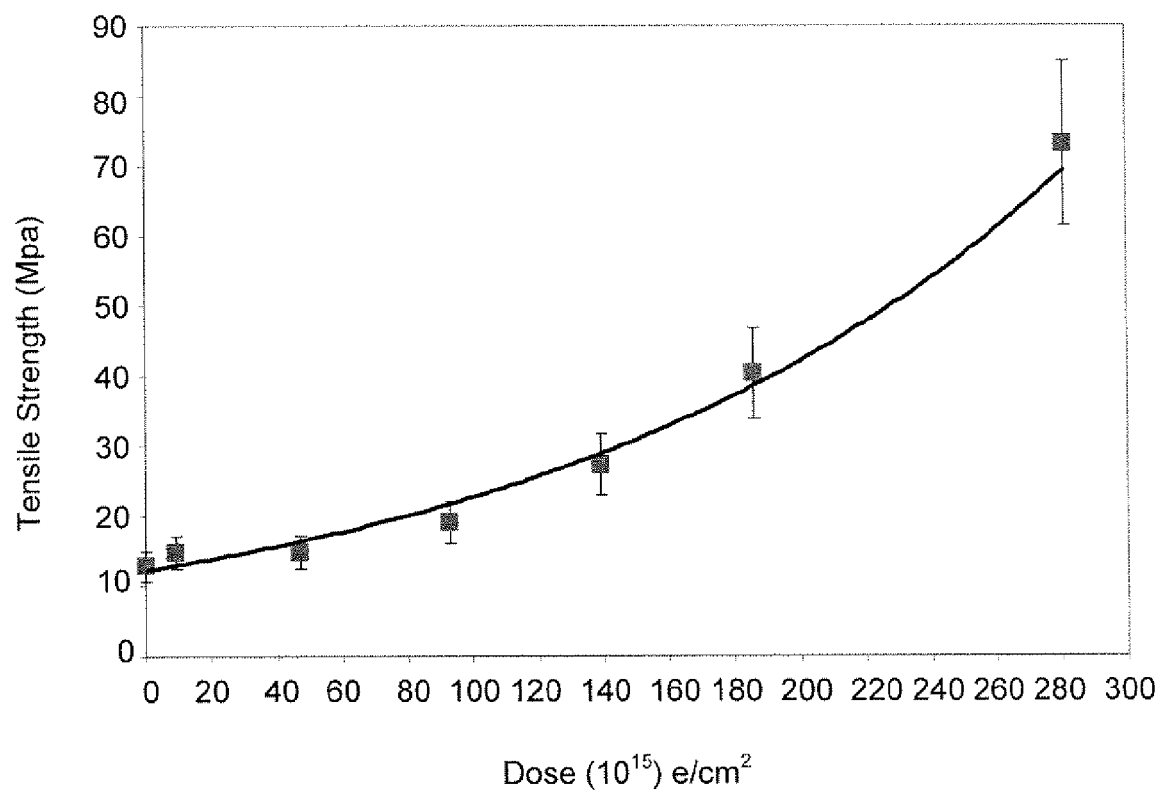
FIG. 3 is a graph which shows tensile strength of a nanoscale fiber film material after receiving various doses of irradiation.

The irradiated SWNT sheets were cut into 4 mm wide and 25 mm long strips, and tested with a DMA (dynamic mechanical analyzer) machine (DMA2980, TA Instruments, New Castle, Del.) using the stress-strain sweeping mode. Stress, strain, and tensile strength tests were conducted on a control (non-irradiated) film and on the irradiated films. As shown in FIG. 2, the mechanical properties of the SWNT films were significantly improved as the dose of E-beam irradiation was increased. FIG. 3 shows the increase in tensile strength as a result of the F-beam dose.

Publications cited herein and the materials for which they are cited are specifically incorporated by reference. Modifications and variations of the methods and materials described herein will be obvious to those skilled in the art from the foregoing detailed description. Such modifications and variations are intended to come within the scope of the appended claims.

We claim:

1. A method of functionalizing a nanoscale fiber film material, comprising the steps of:
    (a) providing a nanoscale fiber film material which comprises a plurality of nanoscale fibers; and
    (b) irradiating the nanoscale fiber film material with a controlled amount of radiation,
    wherein the step of irradiating the nanoscale fiber film material comprises applying an electron beam to the nanoscale fiber film,
    wherein the electron beam applies a dose of electrons in the range from about $10\times10^{15}$ to about $300\times10^{15}$ e/cm².

2. The method of claim 1, wherein the step of irradiating the nanoscale fiber film material is effective to functionalize the plurality of nanoscale fibers.

3. The method of claim 1, wherein the step of irradiating the nanoscale fiber film material increases the tensile strength and modulus of the nanoscale fiber film material.

4. The method of claim 1, wherein the step of irradiating the nanoscale fiber film material increases the toughness of the nanoscale fiber film material.

5. The method of claim 1, wherein the step of irradiating the nanoscale fiber film material increases the electrical and thermal conductivity of the nanoscale fiber film material.

6. The method of claim 1, wherein the step of irradiating the nanoscale fiber film material creates cross-links, interconnections, junctions, or a combination thereof, in the plurality of nanoscale fibers.

7. The method of claim 1, wherein the step of irradiating the nanoscale fiber film material increases interfacial bonding in the plurality of nanoscale fibers.

8. The method of claim 1, wherein the step of irradiating the nanoscale fiber film material comprises irradiating at about 2 MeV.

9. The method of claim 1, wherein the step of providing the nanoscale fiber film material comprises:
    (a) suspending the pluraluty of nanoscale fibers on a liquid medium; and
    (b) removing the liquid medium by at least one of filtration or vaporization to form the nanoscale fiber film material.

10. The method of claim 1, wherein the nanoscale fiber film material has a thickness in the range from about 5 to about 50 microns.

11. The method of claim 1, wherein the plurality of nanoscale fibers comprise a plurality of carbon nanotubes.

* * * * *

UNITED STATES PATENT AND TRADEMARK OFFICE
CERTIFICATE OF CORRECTION

PATENT NO. : 7,862,766 B2
APPLICATION NO. : 11/749302
DATED : January 4, 2011
INVENTOR(S) : Zhiyong Liang et al.

It is certified that error appears in the above-identified patent and that said Letters Patent is hereby corrected as shown below:

Column 6, line 57, replace "on" with --in--.

Signed and Sealed this
Eighth Day of March, 2011

David J. Kappos
*Director of the United States Patent and Trademark Office*